(12) United States Patent
Pithawalla et al.

(10) Patent No.: US 7,004,993 B2
(45) Date of Patent: Feb. 28, 2006

(54) NANOSCALE PARTICLES OF IRON ALUMINIDE AND IRON ALUMINUM CARBIDE BY THE REDUCTION OF IRON SALTS

(75) Inventors: Yezdi B. Pithawalla, Richmond, VA (US); Sarojini Deevi, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 276 days.

(21) Appl. No.: 10/460,318

(22) Filed: Jun. 13, 2003

(65) Prior Publication Data
US 2004/0250654 A1   Dec. 16, 2004

(51) Int. Cl.
B22F 9/24 (2006.01)
C01B 31/30 (2006.01)

(52) U.S. Cl. .................... 75/351; 75/365; 423/115; 423/439

(58) Field of Classification Search .............. 75/348, 75/351, 365
See application file for complete search history.

(56) References Cited

U.S. PATENT DOCUMENTS

| | | | |
|---|---|---|---|
| 5,102,700 A | 4/1992 | Baldi | |
| 5,322,075 A | 6/1994 | Deevi et al. | |
| 5,350,107 A | 9/1994 | Wright et al. | |
| 5,354,354 A | 10/1994 | Edeling et al. | |
| 5,549,973 A | 8/1996 | Majetich et al. | |
| 5,580,655 A | 12/1996 | El-Shall et al. | |
| 5,591,368 A | 1/1997 | Fleischhauer et al. | |
| 5,635,654 A | 6/1997 | Hebsur et al. | |
| 5,695,617 A | 12/1997 | Graiver et al. | |
| 5,770,022 A | 6/1998 | Chang et al. | |
| 5,783,263 A | 7/1998 | Majetich et al. | |
| 5,851,507 A | 12/1998 | Pirzada et al. | |
| 5,879,715 A | 3/1999 | Higgins et al. | |
| 5,891,548 A | 4/1999 | Graiver et al. | |
| 5,934,289 A | 8/1999 | Watkins et al. | |
| 5,962,132 A | 10/1999 | Chang et al. | |
| 5,984,996 A * | 11/1999 | Gonsalves et al. | ............ 75/246 |
| 6,053,176 A | 4/2000 | Adams et al. | |
| 6,262,129 B1 | 7/2001 | Murray et al. | |
| 6,284,191 B1 | 9/2001 | Deevi et al. | |
| 6,368,406 B1 | 4/2002 | Deevi et al. | |
| 6,848,450 B1 | 2/2005 | Lilly, Jr. et al. | |
| 2002/0014453 A1 | 2/2002 | Lilly, Jr. et al. | |

(Continued)

FOREIGN PATENT DOCUMENTS

WO    01/30520 A    5/2001

OTHER PUBLICATIONS

Haber et al., "Nanostructure By Design: Solution-Phase-Processing Routes To Nanocrystalline Metals, Ceramics, Intermetallics, and Composites", *J. Aerosol Sci.*, 1998, pp. 637-45, vol. 29, No. 5/6 Elsevier, Great Britain.

(Continued)

*Primary Examiner*—George Wyszomierski
(74) *Attorney, Agent, or Firm*—Buchanan Ingersoll PC

(57) ABSTRACT

A method of making intermetallic nanoscale particles comprising iron aluminide and/or iron aluminum carbide comprising the steps of preparing a mixture of a solvent, an iron salt and LiAlH$_4$, and heating the mixture to form the intermetallic nanoscale particles. The intermetallic nanoscale particles, which can comprise intermetallic nanoscale particles of iron aluminide and/or iron aluminum carbide in an alumina matrix, are capable of reducing the amount of 1,3-butadiene in the mainstream smoke of a cigarette.

29 Claims, 13 Drawing Sheets

U.S. PATENT DOCUMENTS

| | | |
|---|---|---|
| 2004/0099092 A1 | 5/2004 | Harutyunyan et al. |
| 2004/0247521 A1* | 12/2004 | Bogdanovic et al. ........ 423/644 |
| 2004/0253386 A1 | 12/2004 | Deevi et al. |

OTHER PUBLICATIONS

Haber et al., "Chemical Syntheses of Nanocrystalline Nickel Aluminides", *Chem. Mater.*, 2000, pp. 973-82, vol. 12, American Chemical Society, Washington, D.C.

Haber et al., "Chemical Synthesis of Nanocrystalline Titanium and Nickel Aluminides from the Metal Chloride and Lithium Aluminum Hydride", *Advanced Materials*, 1996, pp. 163-166, vol. 8, No. 2, Wiley-VCH, Winheim, Germany.

Suryanarayanan et al., "Mechanical properties of nanocrystalline copper produced by solution-phase synthesis," *J. Mater. Res.*, 1996, pp. 439-48, vol. 11, No. 2, Materials Research Society, Warrendale, PA.

Suryanarayanan et al., "Deformation, recovery, and recrystallization behavior of nanocrystalline copper produced from solution-phase synthesized nanoparticles," *J. Mater. Res.*, 1996, pp. 449-457, vol. 11, No. 2, Materials Research Society, Warrendale, PA.

Varin et al., "Characterization of nanocrystalline Fe-45 at % Al intermetallic powders obtained by controlled ball milling and the influence of annealing," *Intermetallics, 1999, pp. 917-930, vol. 7*, Elsevier, New York, New York.

Amils et al., "Microstructure and Hardness of Nanostructured Fe-40Al at% Alloy", 1999, pp. 801-806, vol. 12, Elsevier Science Ltd., New York, New York.

Jartych et al., "Magnetic-Properties and Structure of nanocrystalline Fe-Al and Fe-Ni Alloys", 1999, pp. 927-930, vol. 12, Elsevier Science ltd., New York, New York.

Jartych et al., "Hyperfine Interactions in nanocrystalline Fe-Al alloys", 1998, pp. 4929-4936, vol. 10.

Jin Yong Kim et al., "Chemically Induced Reduction: A Viable Process for Synthesizing Gamma-Tial Based Intermetallic Matrix Composite Powders Containing Nanocrystalline TiC", Metallurgical and Materials Transactions B: Process Metallurgy & Materials Processing Science, The Materials Information Soceity, US, vol. 31B, No. 1, Feb. 2000, pp. 151-159, XP000912862, ISSN: 1073-5623.

Pithawalla, Y.B., E.A.: "Chemical Synthesis of Iron Aluminide [FeAl] and Iron Aluminum Carbide [$Fe_3Al_{0.5}$] Nanopowders", Materials Research Bulletin, vol. 39, Nos. 14-15, Dec. 2, 2004, pp. 2303-2316, XP002311313.

International Search Report and Written Opinion dated Dec. 29, 2004 for PCT/IB2004/002185.

* cited by examiner

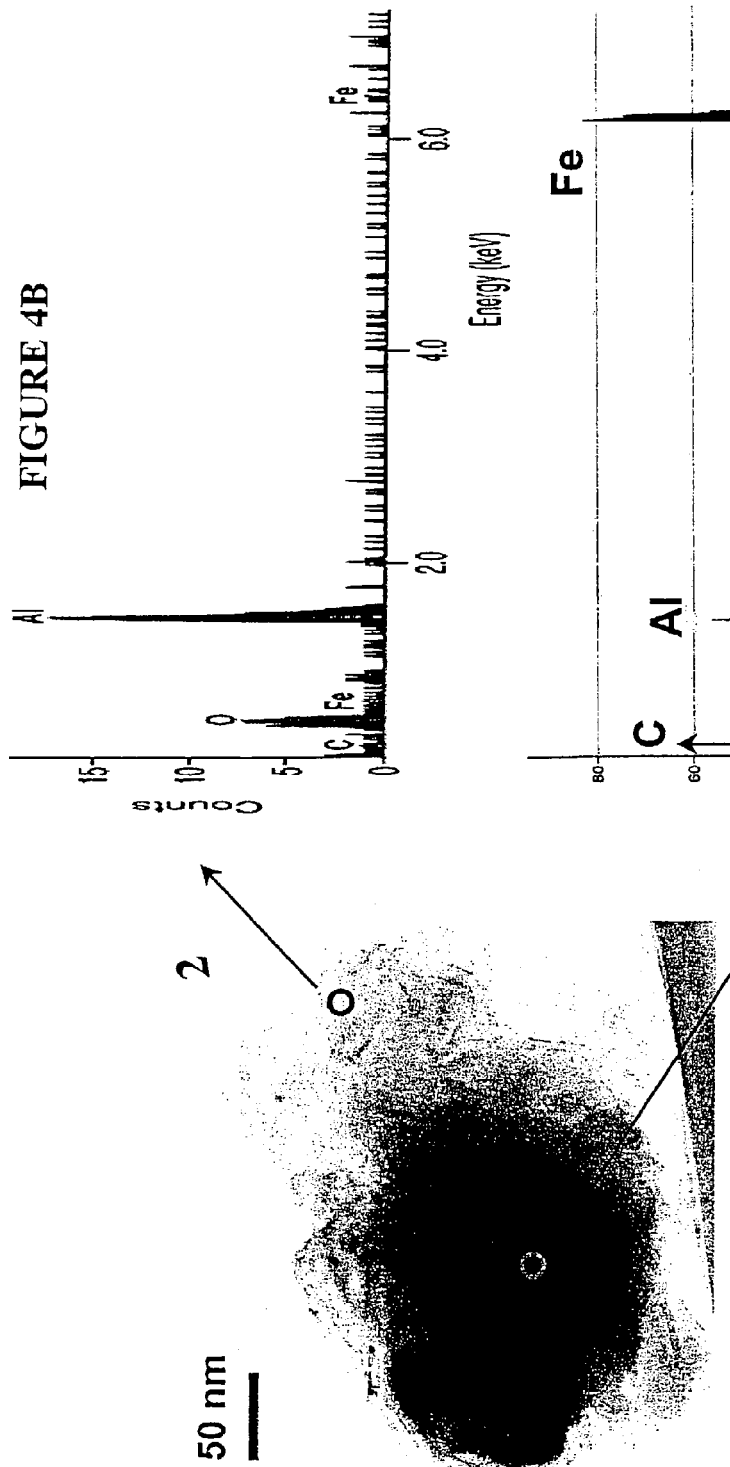
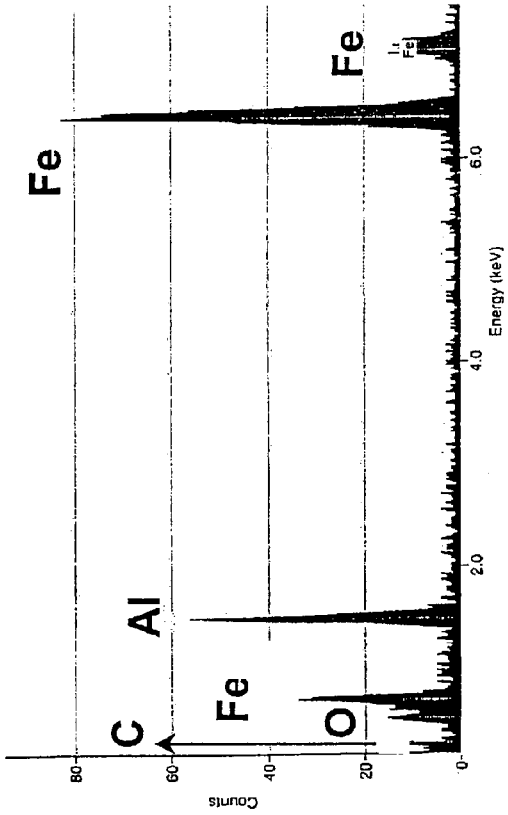
FIGURE 4B
FIGURE 4C
FIGURE 4A

♦ = FeAl
* = $Fe_3AlC_{0.5}$

NANOSCALE PARTICLES OF IRON ALUMINIDE AND IRON ALUMINUM CARBIDE BY THE REDUCTION OF IRON SALTS

BACKGROUND

The iron aluminum system forms a series of solid solutions from 0 to 52 atomic percent aluminum. At room temperature, alloys with less than 18.5 atomic percent (about 10 weight percent) aluminum are body-centered cubic solid solutions with a disordered structure. However, alloys with 18.5 to 35 atomic percent (about 10 to 18 weight percent) aluminum form a DO3 ordered structure, and alloys with greater than about 35 atomic percent (greater than about 18 weight percent) aluminum form the cubic B2 ordered structure.

Intermetallic iron aluminide alloys are of commercial interest because of their high tensile strength, low density, and excellent resistance at high temperatures to wear, corrosion and oxidation. According to commonly assigned Published U.S. Application No. 2002/0014453, nanoscale iron aluminides are also attractive as filtration materials, for example, for the selective abatement of 1,3-butadiene. However, as disclosed by Haber et al. in Advanced Materials, 1996, 8, No. 2 (pp. 163–166) and in Chem. Mater., 2000, 12 (pp. 973–982), commercial application of aluminides has been limited because coarse-grained aluminides are too brittle for many applications. As disclosed by Varin et al., in Intermetallics, 7 1999, (p. 917), particle size refinement, particularly to nanoscale (below 1 micron) dimensions, has been predicted to improve physical properties of iron aluminide intermetallic alloys.

As disclosed by Haber et al. in J. Aerosol Sci., Vol 29, No 5/6 (1998) (pp. 637–645), nanoscale particles have been made from metals, alloys, intermetallics and ceramics. U.S. Pat. Nos. 5,580,655; 5,695,617; 5,770,022; 5,851,507; 5,879,715; 5,891,548; 5,962,132; 6,262,129 and 6,368,406, the disclosures of which are all hereby incorporated by reference, relate to the formation of nanoscale particles using a variety of techniques including chemical synthesis, gas-phase synthesis, deposition by ionized cluster beams, high speed milling and sol-gel routes. These methods suffer from numerous drawbacks, however, including agglomeration, impurities or broad particle size distribution. In J. Mater. Res. Vol. 11, No. 2 (1996) (pp. 439–448 and 449–457) Suryanarayana et al. disclose the formation of nanocrystalline copper powder via the reduction of CuCl in $NaBH_4$.

The most common method reported in the literature for the synthesis of intermetallic nanoparticles is mechanical ball milling. (See, for example, Jartych E., et al., J. Phys. Condens. Matter, 10:4929 (1998); Jartych E., et al., Nanostructured Materials, 12:927 (1999); and Amilis, X., et al., Nanostructured Materials 12:801 (1999)). Commonly assigned U.S. Pat. No. 6,368,406 discloses preparation of nanoscale FeAl by laser vaporization.

Despite the developments to date, there is interest in improved and more efficient methods of making aluminide materials and/or materials effective in reducing the amount of various constituents such as 1,3-butadiene in the mainstream smoke of a cigarette during smoking. Preferably, such methods and compositions should not involve expensive or time consuming manufacturing and/or processing steps.

Disclosed is a simple, novel and high yield approach for synthesizing iron aluminide and/or iron aluminum carbide nanoparticles via the chemical reduction of iron salts with lithium aluminum hydride. The chemical reduction technique provides several advantages including the capacity to generate large quantities of nanoscale particles.

SUMMARY

A method of manufacturing intermetallic nanoscale particles comprising iron aluminide and/or iron aluminum carbide, comprises (a) preparing a mixture comprising a solvent, an iron salt and $LiAlH_4$; and (b) heating the mixture to form the intermetallic nanoscale particles.

According to one embodiment, the solvent comprises toluene, 1,3,5-trimethyl benzene, diethyl ether, tetrahydrofuran or mixtures thereof, and the iron salt comprises iron chloride. The $LiAlH_4$ can be added to the mixture to give an atomic ratio of Al:Fe of about 10 to 52%. Preferably, the step of preparing the mixture is carried out at a temperature of from about 20° C. to 100° C. in an inert atmosphere. According to another embodiment, the mixture of $FeCl_3$ and $LiAlH_4$ can be refluxed in a non-aqueous solvent and an inert atmosphere for a period of about 1 to 48 hours.

The mixture can be filtered prior to the step of heating and/or dried prior to the step of heating. Drying of the mixture can be carried out in vacuum or in an inert atmosphere by heating the mixture to a temperature of from about 100° C. to 250° C.

The step of heating comprises heating the mixture, preferably in an inert and/or reducing atmosphere, to a temperature of from about 400° C. to 1200° C. According to a preferred embodiment, the step of heating the mixture can be carried out in an atmosphere comprising hydrogen and argon. According to a further preferred embodiment the mixture can be heated at a heating rate of less than about 5° C./min. whereby the intermetallic nanoscale particles comprise greater than about 50% by volume iron aluminide. According to another preferred embodiment, the mixture can be heated at a heating rate of greater than about 5° C./min. whereby the intermetallic nanoscale particles comprise greater than about 50% by volume iron aluminum carbide.

The nanoscale particles can comprise iron aluminide particles having an average particle size of from about 2 to 10 nm. Alternatively, the nanoscale particles can comprise iron aluminum carbide particles having an average particle size of from about 30 to 100 nm. Preferably the nanoscale particles comprise crystalline particles that are magnetic. According to a preferred embodiment, the nanoscale particles have a B2 or DO3 ordered structure. The intermetallic nanoscale particles can be formed in an aluminum and oxygen-rich matrix such as an amorphous alumina phase.

According to a further embodiment, a tobacco cut filler composition comprises tobacco and intermetallic nanoscale particles of iron aluminide and/or iron aluminum carbide in an alumina matrix capable of reducing the amount of 1,3-butadiene in mainstream smoke. Preferably the tobacco cut filler comprises the intermetallic nanoscale particles in an amount effective to remove at least about 10%, preferably at least about 15%, more preferably at least about 25% of the 1,3-butadiene in the mainstream smoke of a cigarette. Another embodiment provides a method of making a cigarette, comprising (i) adding iron aluminide and/or iron aluminum carbide nanoscale particles in an alumina matrix to tobacco cut filler, cigarette paper and/or a cigarette filter; (ii) providing the cut filler to a cigarette making machine to form a tobacco rod; (iii) placing a paper wrapper around the tobacco rod to form the cigarette; and (iv) optionally attaching a cigarette filter to the cigarette. A still further embodiment relates to a cigarette comprising cut filler, wherein the cut filler comprises tobacco and intermetallic nanoscale particles of iron aluminide and/or iron aluminum carbide in an alumina matrix.

BRIEF DESCRIPTION OF THE DRAWINGS

FIG. 2C shows a portion of FIG. 2B but with a magnification of 30,000×.

FIG. 4A shows a TEM (magnification about 180,000×) and FIGS. 4B and 4C show site specific EDX analysis, respectively, of composite particles comprising nanoscale iron aluminum carbide in alumina after heating the colloidal solution to 875° C. in argon. FIG. 4B shows data corresponding to the alumina matrix surrounding the iron aluminum carbide particle and FIG. 4C shows data corresponding to the iron aluminum carbide.

DETAILED DESCRIPTION OF THE PREFERRED EMBODIMENTS

A method of manufacturing nanoscale iron aluminide and/or iron aluminum carbide intermetallic particles comprises preparing a mixture of solvent(s), a metal salt and $LiAlH_4$, and heating the mixture to form the intermetallic nanoscale particles.

By way of example, the mixture can be prepared by dissolving an iron salt in a solvent or mixture of solvents and adding $LiAlH_4$ to the mixture. The salt may comprise anhydrous iron salts such as nitrates, sulfates and hydroxides. According to a preferred embodiment, the iron salt is iron chloride. The step of preparing the mixture can be performed at a temperature of from about 20° C. to 100° C., e.g., from about 60° C. to 80° C. The solubility of the salt in the solvent can be increased by heating the temperature of the mixture to above room temperature during the step of preparing the mixture. The $LiAlH_4$ serves both as a reducing agent and as a source of Al. $LiAlH_4$ is commercially available as a powder or in solution with diethyl ether or tetrahydrofuran. As seen with reference to the equations below, the stoichiometry of the reactants can control which intermetallic phases are formed. Preferably, the $LiAlH_4$ is added to the mixture to give an atomic ratio of Al:Fe of from about 10 to 52%, e.g., an Al:Fe ratio of 10:90, 15:85, 20:80, 25:75, 30:70, 35:65, 40:60, 45:55 or 50:50. When ethereal solvents are used, an excess of $LiAlH_4$ can be added in order to compensate for aluminum that may complex with the solvent and form aluminum oxide during the heating step. The mixture of $FeCl_3$ and $LiAlH_4$ can be refluxed in a non-aqueous solvent in an inert atmosphere for a period of about 1 to 48 hours, e.g., 2 to 8 to 16, 16 to 24 or 24 to 48 hours.

Because $LiAlH_4$ reacts violently with acidic protons (e.g., $H_2O$, MeOH), non-protic aromatic solvents such as toluene or 1,3,5-trimethyl benzene, or non-protic ethereal solvents such as diethyl ether ($Et_2O$) or tetrahydrofuran (THF) are preferred. The solvents are preferably in an anhydrous form (e.g., greater than about 99.5% purity). Furthermore, due to the high level of reactivity of the hydride to moisture, preferably the step of preparing the mixture is carried out in a dry, inert or reducing atmosphere. The inert or reducing atmosphere can comprise, for example, helium, nitrogen, argon or mixtures thereof.

Addition of $LiAlH_4$ to the mixture causes reduction of the iron salt and the precipitation of black colloidal particles. Hydrogen gas is evolved according to the general equations:

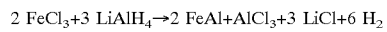

$2\ FeCl_3 + 3\ LiAlH_4 \rightarrow 2\ FeAl + AlCl_3 + 3\ LiCl + 6\ H_2$

$3\ FeCl_3 + 3\ LiAlH_4 \rightarrow Fe_3Al + 2\ AlCl_3 + 3\ LiCl + 6H_2$

Figure 1:
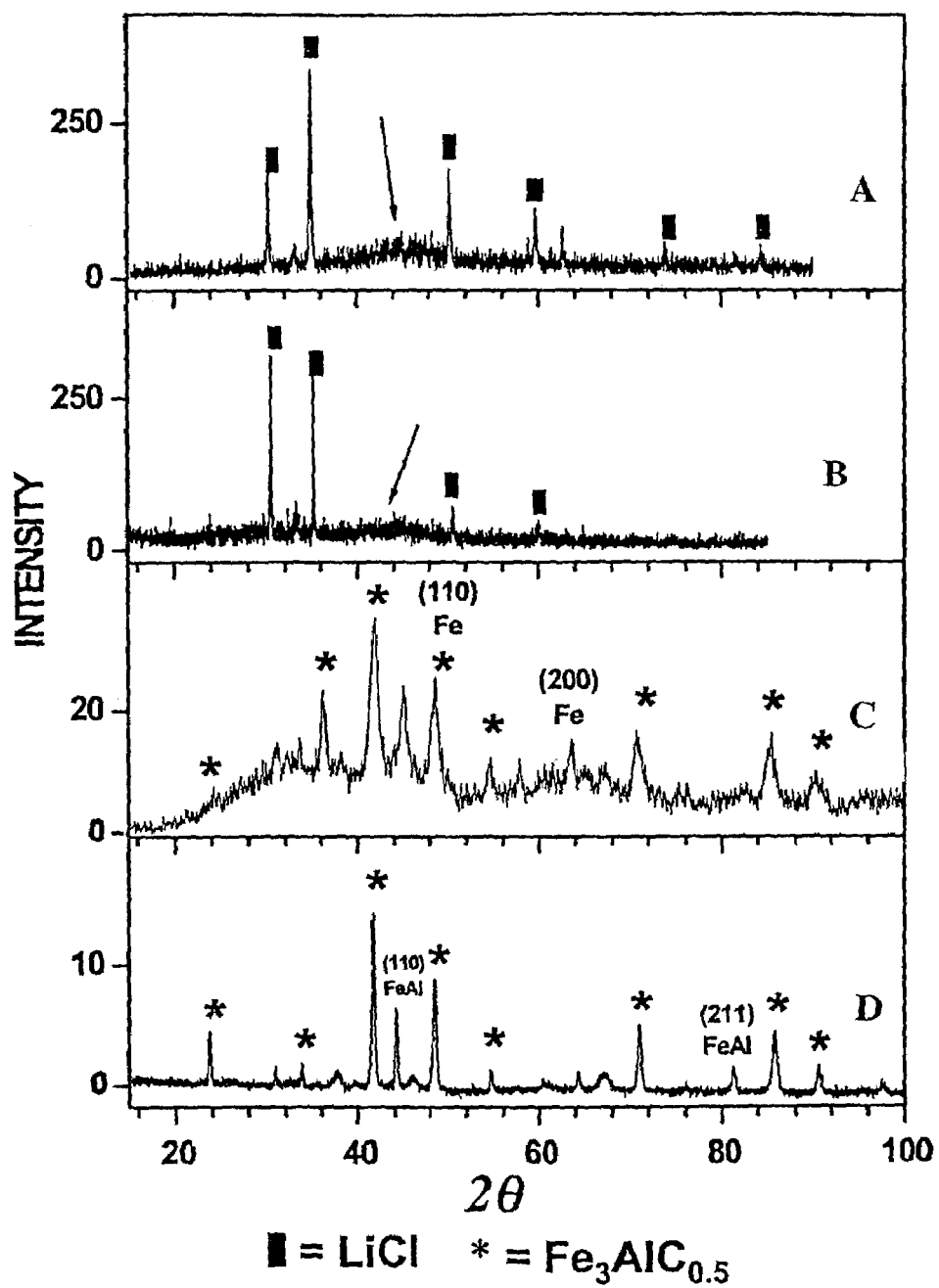
FIG. 1 shows effects of heating on the presence of lithium chloride and iron aluminum carbide in precipitated colloids using THF as a solvent: (A) prior to heating; (B) after heating at 300° C.; (C) after heating at 550° C.; and (D) after heating at 875° C. in argon.

FIG. 1 shows an x-ray diffraction pattern for as-precipitated colloids prepared under nitrogen gas using THF as a solvent. The as-precipitated product is mainly amorphous. Referring to FIG. 1, the crystalline peaks in curve A correspond mainly to LiCl, while the broad reflection between about 40–44° (shown by the arrow) corresponds to amorphous nanoscale phases. It is believed that the amorphous nanoscale phases comprise a highly homogeneous mixing of Fe- and Al-containing phases.

Heating of the colloidal mixture to a temperature of from about 400° C. to 1200° C. drives the above reactions to completion and results in the formation of nanoscale iron aluminide phases. The as-formed colloidal mixture can be directly heated to form the intermetallic particles or the colloidal mixture can initially be converted to a dried powder by drying the colloidal mixture at a temperature up to about 120° C. in an inert or reducing atmosphere. For both the optional drying step and the heating step, preferably the mixture is heated in an inert or reducing atmosphere such as hydrogen, nitrogen, helium, argon or mixtures thereof. According to a preferred embodiment, the mixture can be heated in an atmosphere comprising 5–10% hydrogen in argon. At temperatures above about 550° C., the LiCl is removed from the samples by sublimation. The resulting intermetallic nanoscale particles comprise iron aluminide (e.g., FeAl) and/or iron aluminum carbide (e.g., $Fe_3AlC_{0.5}$). The heating step is typically carried out for a period of about 10 hours, and the as-heated samples are preferably stored under nitrogen or another inert gas. It is believed that the as-precipitated colloids comprise a highly homogeneous, molecular-level mixing of Fe- and Al-containing phases that upon heating react to form crystalline nanoscale particles. As discussed below, the intermetallic nanoscale particles can crystallize in an amorphous alumina matrix wherein the amount of nanoscale particles can range from about 1 to 99%, 5 to 95%, 10 to 90%, 15 to 85%, 20 to 80%, 25 to 75%, 30 to 70%, 35 to 65%, 40 to 60%, or 45 to 55%. Prior to the step of heating, the mixture can be washed with solvents such as THF or diethyl ether and filtered. The presence of carbon in the nanoscale particles can increase the ductility, creep resistance and/or yield strength of articles made from the particles.

Curves B–D in FIG. 1 show x-ray diffraction patterns as a function of temperature for the sample discussed above in reference to curve A. After heating to about 300° C. in argon (curve B) the predominant crystalline phase is LiCl. Further heating to about 550° C. in argon (curve C) results in a black magnetic powder having x-ray reflections consistent with nanoscale Fe and nanoscale iron aluminum carbide ($Fe_3AlC_{0.5}$). Finally, after heating to about 875° C. in argon (curve D), the sample comprises a black magnetic powder and the XRD pattern comprises reflections from intermetallic iron aluminide (e.g., B2 type FeAl) and iron aluminum carbide only.

Figure 2A:
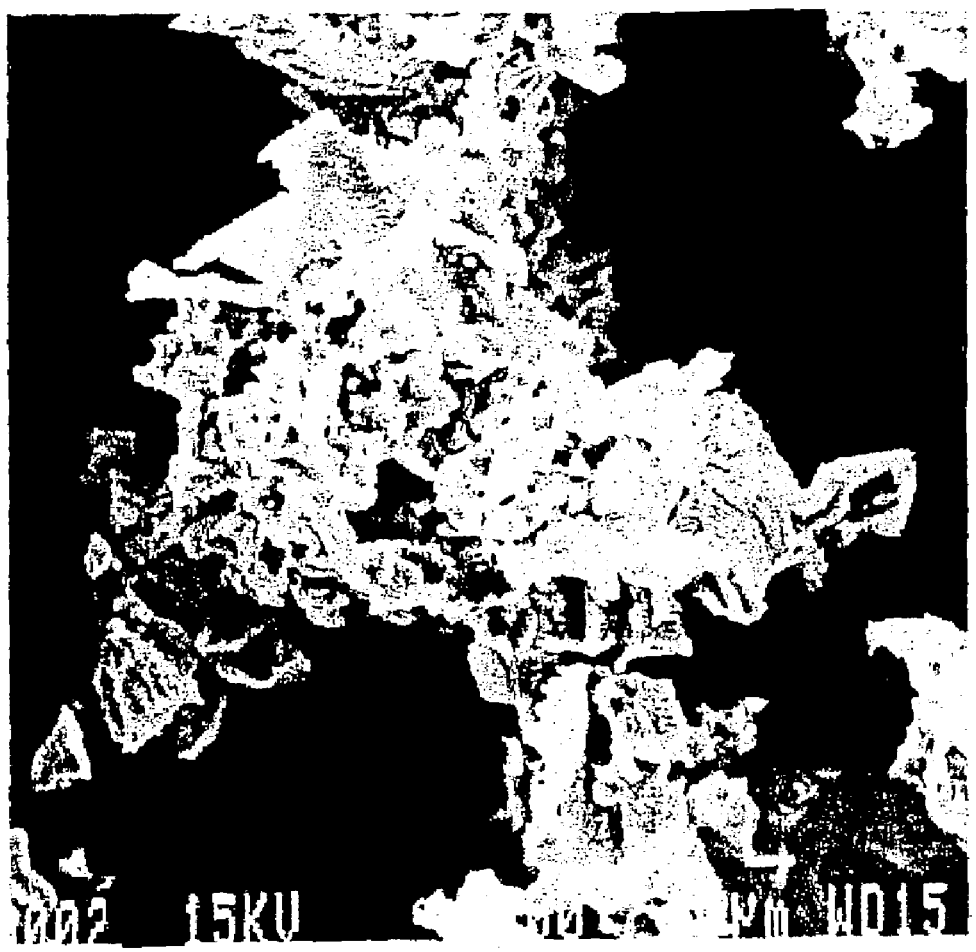
FIGS. 2A–C show SEM micrographs of the nanoscale particles formed following heating of the initial colloidal mixture at (A) 300° C., and (B–C) 875° C. in argon wherein FIGS. 2A and B are magnifications of 1,500×
Figure 2C:
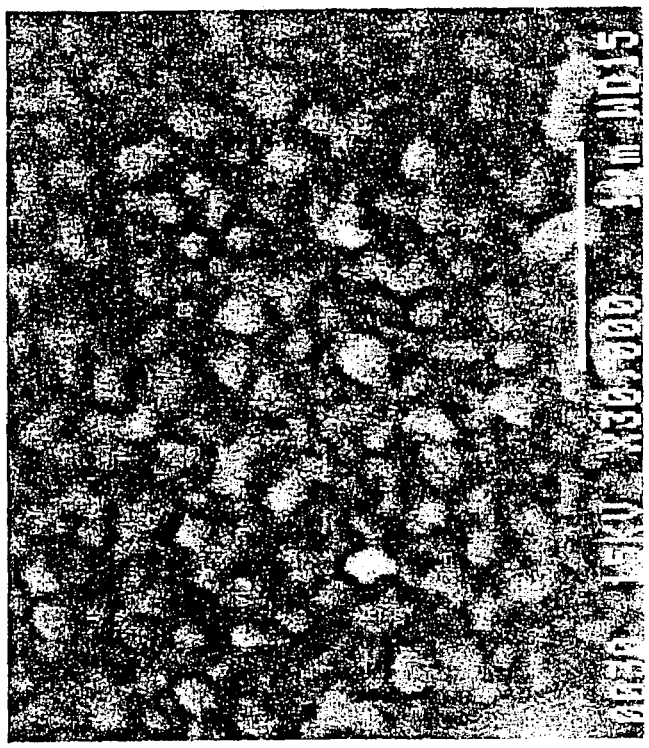
Figure 2B:

FIG. 2A shows an SEM image of the above curve B sample after heat treatment to 300° C. in argon. The sample comprises mainly irregularly shaped, micron-sized aggregates. FIG. 2B shows an SEM image of the curve D sample after heat treatment to 875° C. in argon and FIG. 2C shows a higher magnification of the portion of FIG. 2B enclosed within the rectangular border. Referring to FIGS. 2B and 2C, the sample comprises individual nanoscale intermetallic particles dispersed on larger, micron-scale aggregates.

Figure 3A:
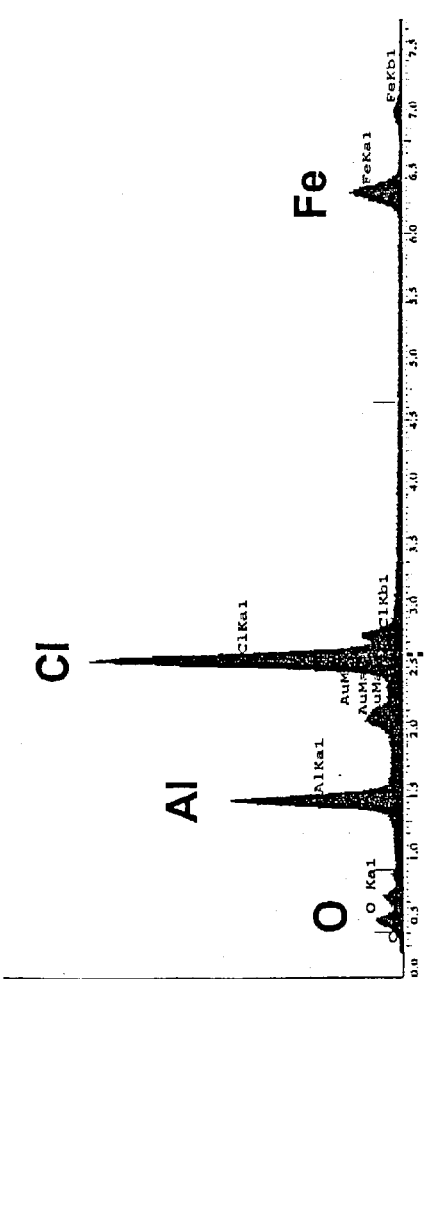
FIGS. 3A–B show EDX spectra from the nanoscale particles formed after heating the colloidal mixture using THF as a solvent at (A) 300° C., and (B) 875° C. in argon, respectively, showing presence and absence of chlorine.
Figure 3B:
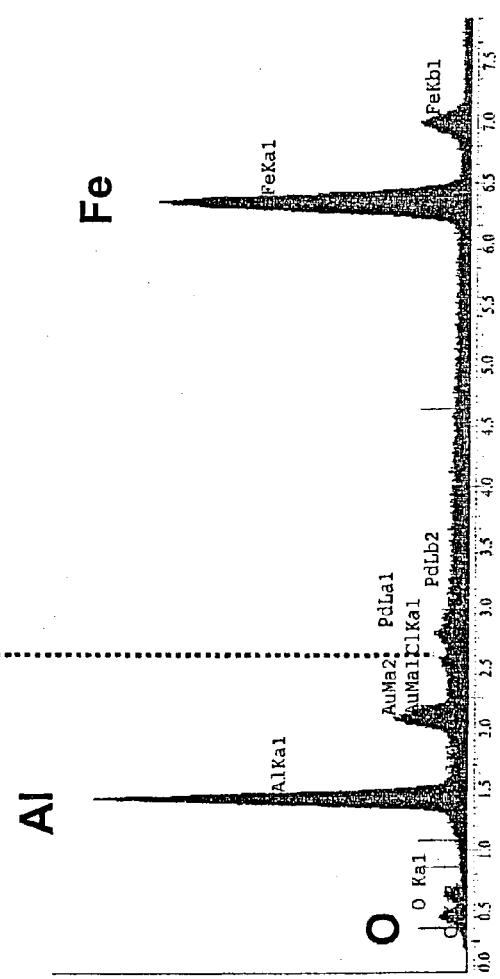
Figure 5:
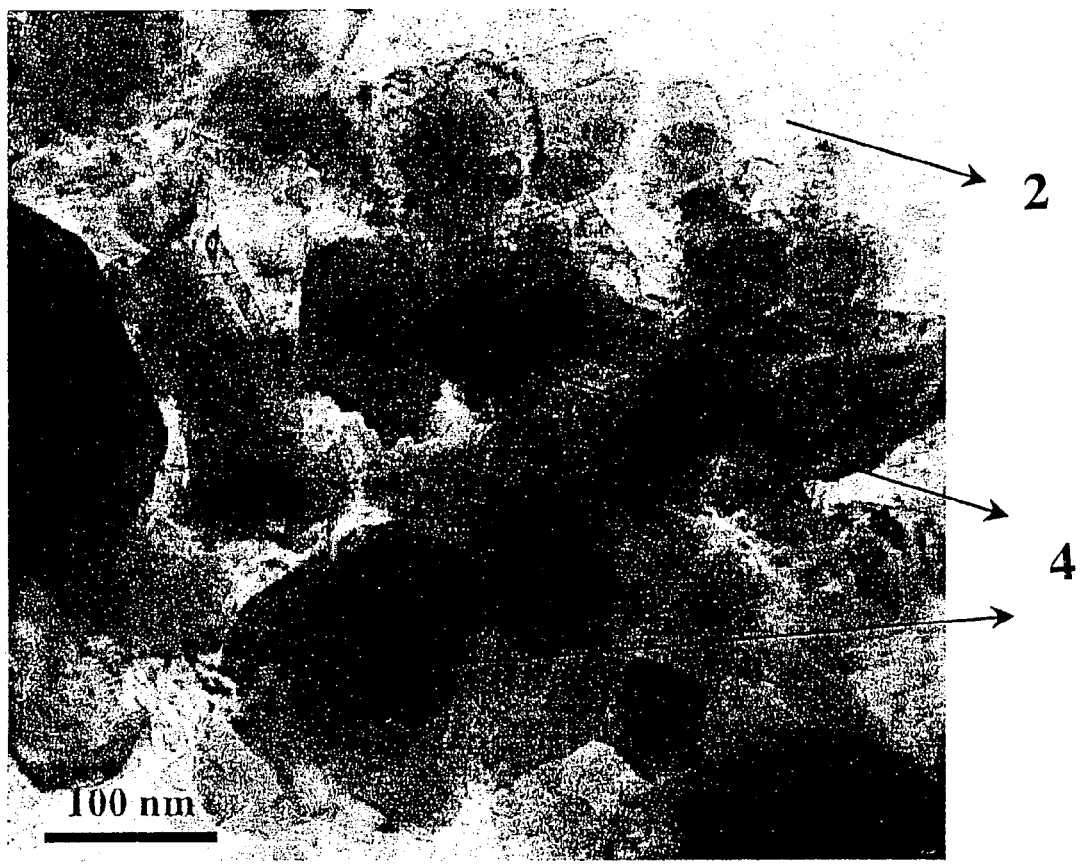
FIG. 5 shows a TEM image (magnification about 230,000×) of nanoscale iron aluminum carbide particles in a matrix comprising aluminum and oxygen.

Changes in chemical composition of samples after heating to 300° C. and 875° C. in argon are shown in FIGS. 3A and 3B. Referring to FIG. 3A, which shows energy dispersive x-ray analysis (EDX), after heating to 300° C. the sample comprises mostly Cl, Fe and Al, while after heating to 875° C. (FIG. 3B) the sample comprises mostly Fe and Al. TEM and site-specific EDX, shown in FIGS. 4A–4C reveal that after heating to 875° C. in argon the samples comprise nanoscale iron aluminum carbide ($Fe_3AlC_{0.5}$) crystallites 4 (FIG. 4C) in an amorphous alumina matrix 2 (FIG. 4B). FIG. 5 shows a TEM image of the nanoscale iron aluminum carbide particles 4 in an alumina matrix 2. These particles, which were derived from a THF-based reduction of $FeCl_3$, are oval in shape and have an average particle size of from about 30 to 100 nm. The intermetallic nanoscale particles can have an average particle size less than about 100 nm, e.g., less than 90 nm, less than 80 nm, less than 70 nm, less than 60 nm, less than 50 nm, less than 40 nm, less than 35 nm, less than 30 nm, less than 25 nm, less than 20 nm, less than 15 nm, or less than 10 nm. After heating, samples made from the reduction of iron chloride in THF comprise nanoscale intermetallic iron aluminide and iron aluminum carbide particles in an amorphous alumina matrix. The intermetallic particles made using THF are predominately iron aluminum carbide.

Figure 6:
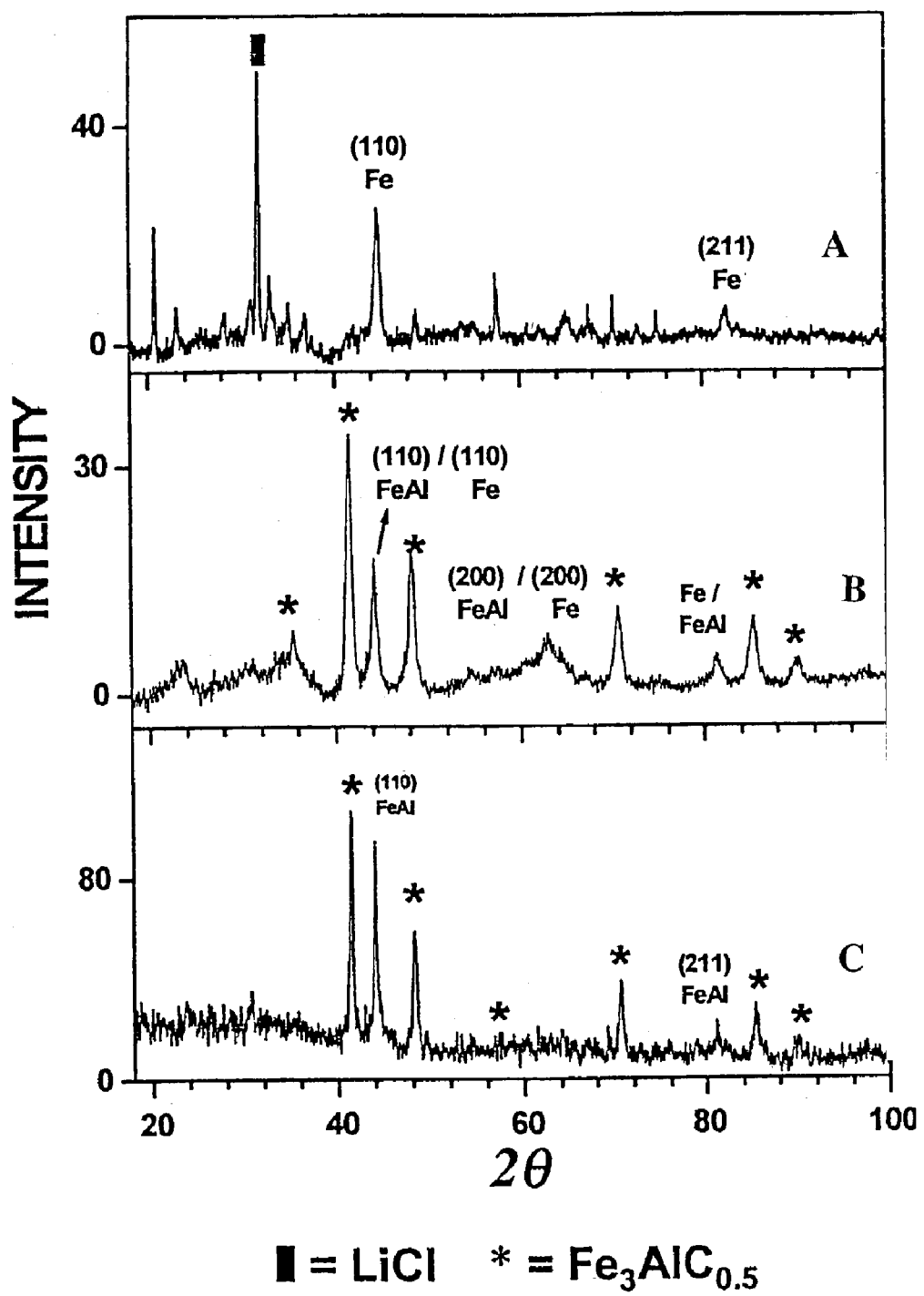
FIG. 6 shows effects of heating on the presence of lithium chloride and iron aluminum carbide in precipitated colloids using diethyl ether as a solvent (A) prior to heating; (B) after heating at 600° C., and (C) after heating at 750° C. in argon.

The choice of solvent can affect the composition of the intermetallic nanoscale particles. When diethyl ether ($Et_2O$) is used as a solvent, similar results to those obtained for tetrahydrofuran (THF) are obtained. $LiAlH_4$ is a soluble, strong reducing agent in both diethyl ether and tetrahydrofuran. Curves A–C of FIG. 6 show the x-ray diffraction patterns as a function of temperature for $FeCl_3$ reduced with $LiAlH_4$ using $Et_2O$ as a solvent. After heating the precipitates in argon to temperatures below about 550° C. (curve A) the dominant reflections are from LiCl and nanoscale Fe particles. As previously noted, when the samples are heated in argon to temperatures above about 550° C., the LiCl is removed by sublimation and the samples comprise a black magnetic powder. After heating to about 600° C. (curve B), the samples comprise crystalline Fe, FeAl and $Fe_3AlC_{0.5}$ phases. After heating to about 750° C. (curve C), the samples comprise a mixture of FeAl and $Fe_3AlC_{0.5}$ phases only. The intermetallic nanoscale particles made using ethereal solvents are predominately iron aluminum carbide. Without wishing to be bound by theory, it is believed that ethereal solvents such as diethyl ether and tetrahydrofuran provide sources of carbon that can contribute to carbide formation. Furthermore, intermetallic nanoscale particles made using ethereal solvents are embedded in an alumina matrix. The alumina matrix is believed to form from Al that combines with oxygen that is abstracted from ethereal solvents in the presence of a strong reducing agent.

Figure 7A:
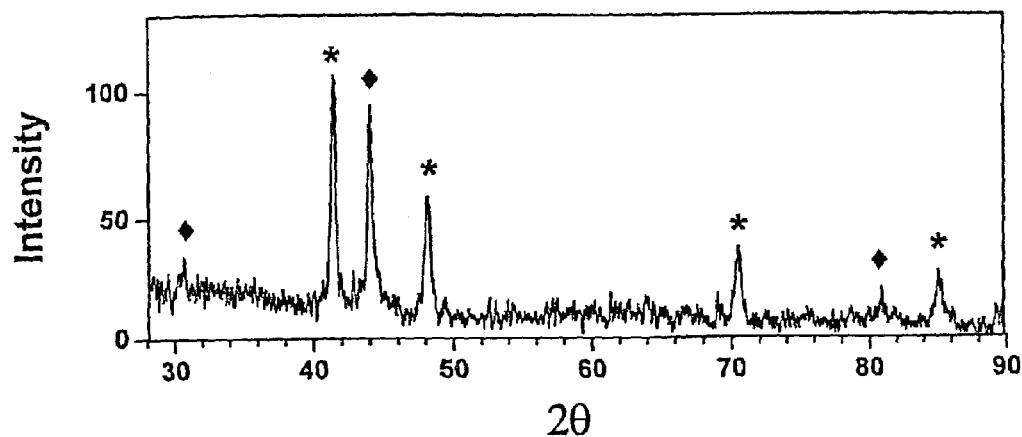
FIGS. 7A and 7B show the effects of solvent on the formation of iron aluminide and iron aluminum carbide.
Figure 7B:
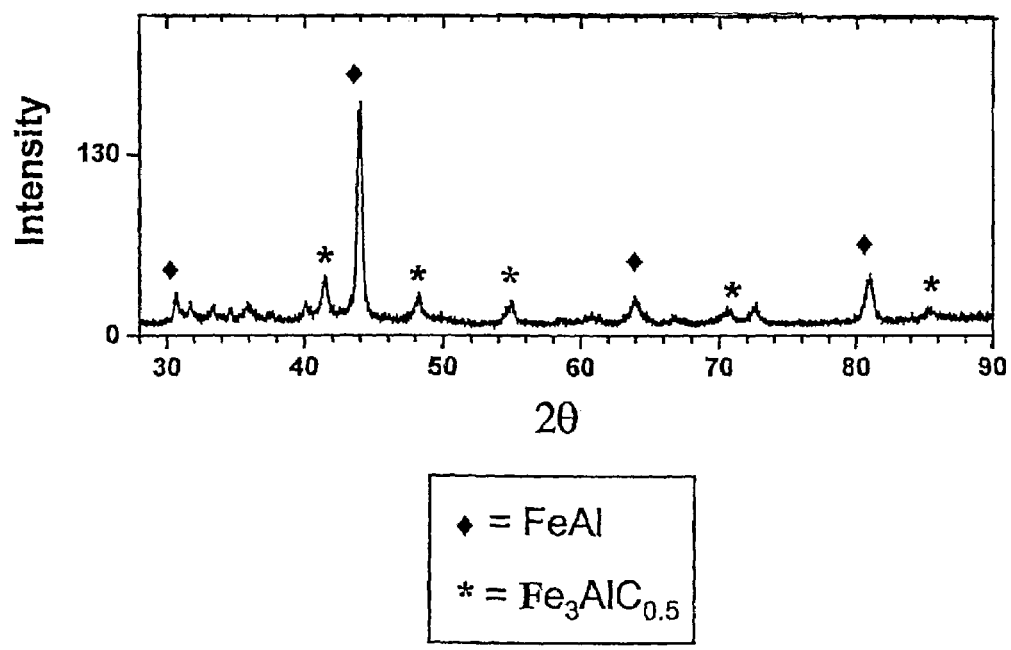

In contrast to ethereal solvents, when the non-protic solvent is predominately toluene the major crystalline phase after heating to elevated temperatures is iron aluminide (FeAl). Compared with ethereal solvents, the $LiAlH_4$ is less soluble in aromatic solvents such as toluene and 1,3,5-trimethylbenzene. A comparison of the resulting intermetallic crystalline phases is shown in FIGS. 7A and 7B, which show the diffraction patterns for two different samples heated in argon to 750° C. For the sample shown in FIG. 7A, the solvent used was diethyl ether. In contrast, for the sample shown in FIG. 7B, the solvent used was a 75/25 vol. % toluene/THF mixture. Other suitable mixture ratios include 20/80 vol. %, 30/70 vol. %, 40/60 vol. %, 50/50 vol. %, 60/40 vol. %, 70/30 vol. % and 80/20 vol. %. The x-ray reflections from the sample where ether was the solvent, consistent with the results discussed previously, are predominately $Fe_3AlC_{0.5}$, while the x-ray reflections from the sample where a 75/25 vol. % toluene/THF mixture was the solvent are predominantly B2 type FeAl.

Figure 8A:
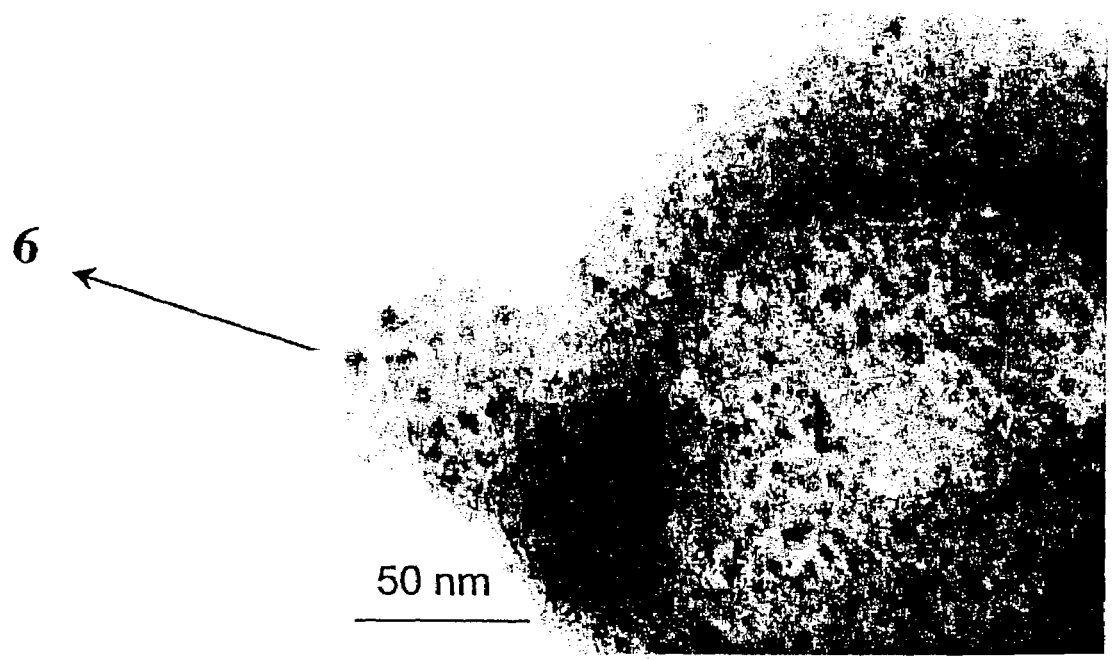
FIGS. 8A and 8B show TEM and EDX analysis of particles comprising nanoscale iron aluminide after heating to 750° C. in argon.
Figure 8B:
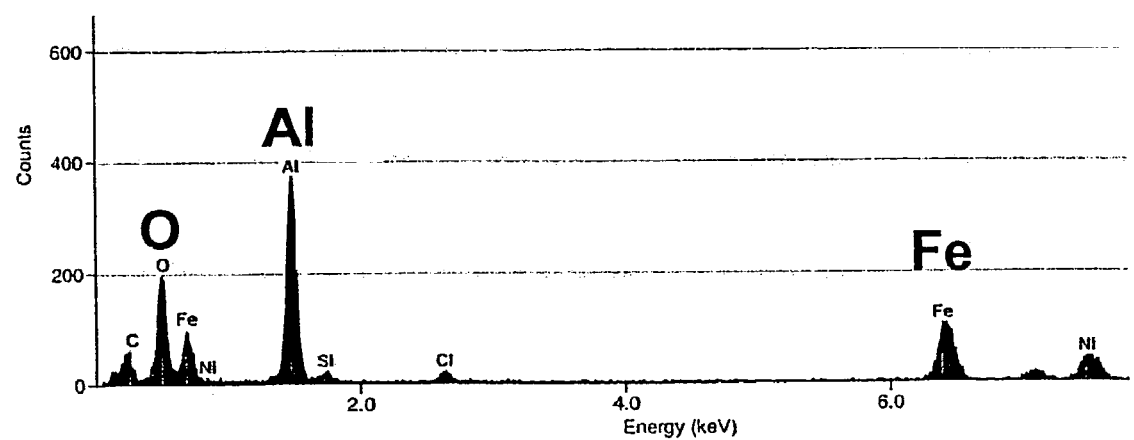
Figure 9:
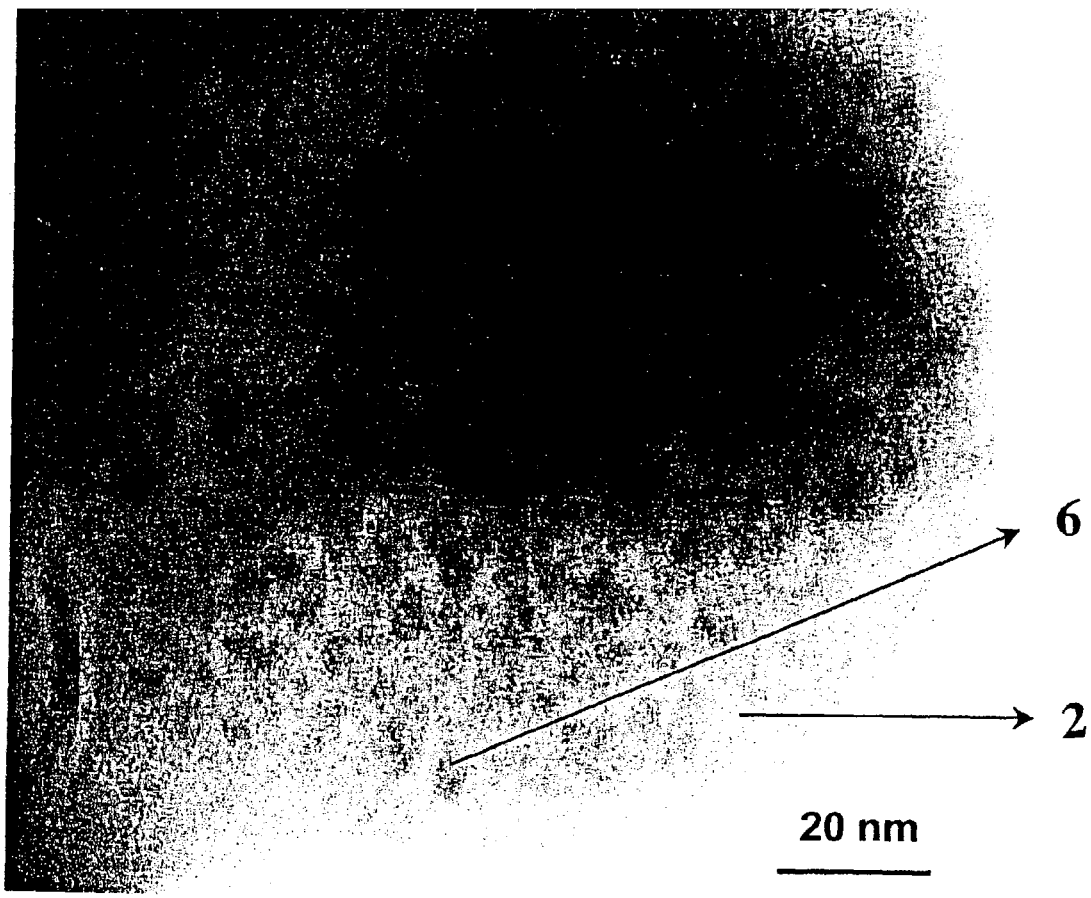
FIGS. 9 and 10 show TEM images of nanoscale iron aluminide particles in a matrix comprising aluminum and oxygen.
Figure 10:
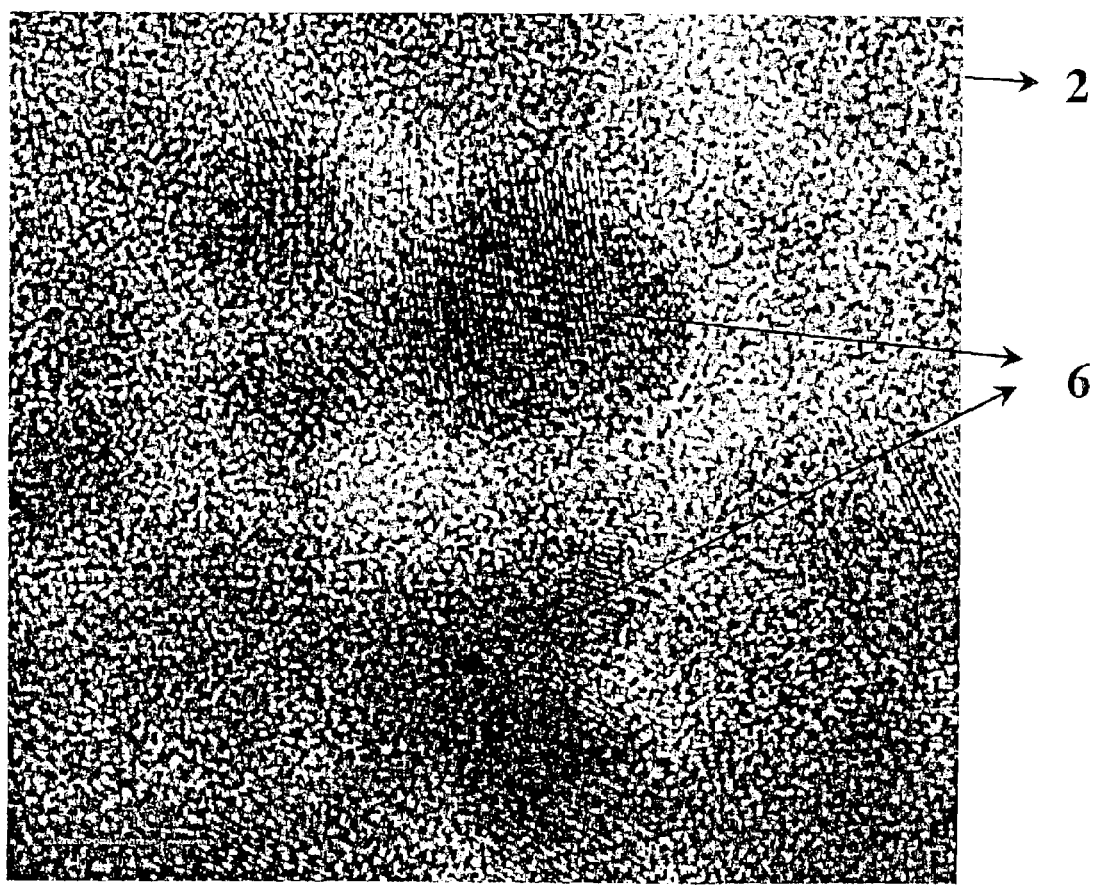

For $FeCl_3$ reduced with $LiAlH_4$ using a 75/25 vol. % toluene/THF mixture as a solvent, TEM and EDX, shown in FIGS. 8A and 8B, respectively, reveal that after heating to 750° C. in argon the samples comprise nanoscale iron aluminide (FeAl) particles 6. EDX (FIG. 8B) shows that the sample comprises mostly O, Al and Fe. FIGS. 9–10 show TEM images of the nanoscale iron aluminide (FeAl) particles 6 in an amorphous alumina matrix 2. These nanoscale FeAl particles are oval in shape and have an average particle size of from about 2 to 10 nm.

After heating, samples made from the reduction of iron chloride in a 75/25 vol. % toluene/THF mixture comprise predominately intermetallic iron aluminide particles in an alumina matrix. Furthermore, unlike ethereal solvents, which can strongly coordinate with Al and form alumina, aromatic solvents do not introduce a direct source of oxygen to the mixture. Therefore, as compared to ethereal solvents, less alumina can be formed using aromatic solvents. The presence of THF in the 75/25 vol. % toluene/THF mixture is believed to contribute to the formation of the carbide phase and the alumina matrix.

Figure 11A:
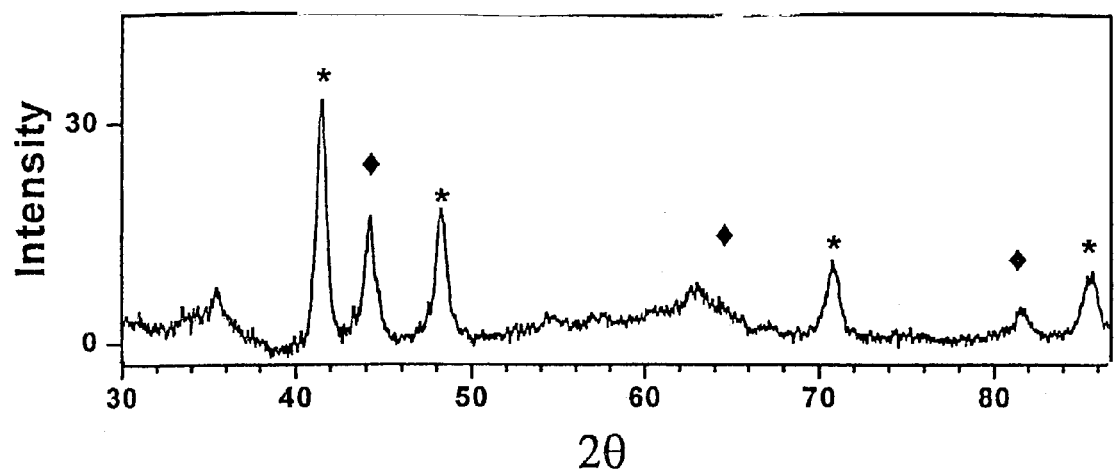
FIGS. 11A and 11B show the effect of heating rate on formation of iron aluminide and iron aluminum carbide.
Figure 11B:
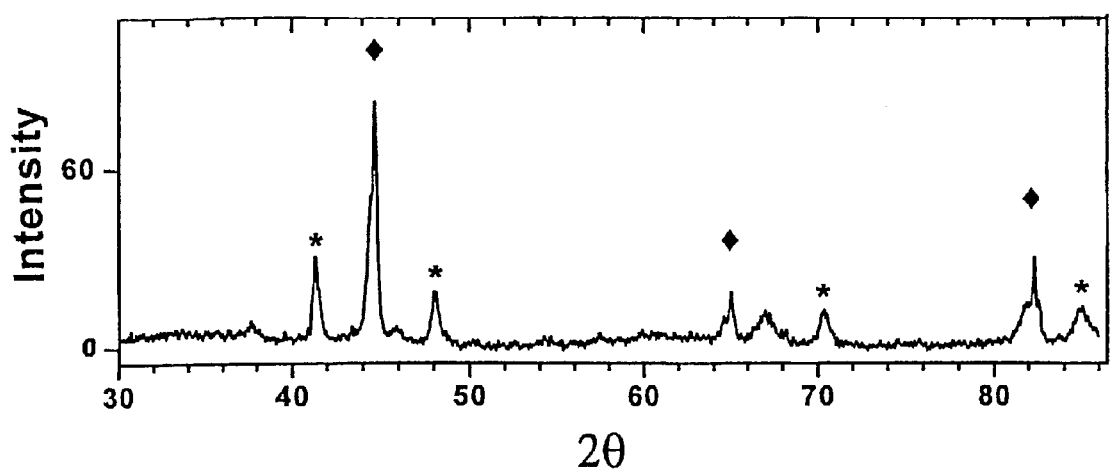

The heating rate can affect the composition of the intermetallic nanoscale particles when an ethereal solvent is used in the reduction of $FeCl_3$. Using an ethereal solvent, iron aluminum carbide ($Fe_3AlC_{0.5}$) comprises greater than 50% by volume of the intermetallic nanoscale particles when the sample is heated at a heating rate of greater than about 5° C./min., while iron aluminide (FeAl) comprises greater than about 50% by volume of the intermetallic nanoscale particles when the sample is heated at a heating rate of less than about 5° C./min. This effect can be seen in FIGS. 11A–11B, which show XRD scans for two samples heated to 600° C. in argon. In FIG. 11A, the sample was ramped to temperature at 10° C./min. and comprises predominately the carbide phase, while in FIG. 11B the sample was ramped to temperature at 2° C./min. and comprises predominately iron aluminide.

The effect of heating rate can be minimized by drying the mixture prior to the step of heating. Preferably, the mixture is dried in vacuum or in an inert atmosphere at a temperature of from about 100° C. to 250° C. Complete removal of solvent prior to heating the colloids to elevated temperature (e.g., greater than about 400° C.) can decrease the amount of carbide phase that forms. Furthermore, as compared to ethereal solvents, when a non-ethereal solvent was used the heating rate had less effect on the composition of the final product.

Because of their high surface area to volume ratio, the intermetallic nanoscale particles can be used in catalysis applications. A preferred catalyst material comprises nanoscale iron aluminide particles and/or nanoscale iron aluminum carbide particles in an alumina matrix.

One embodiment provides a tobacco cut filler composition comprising tobacco and an effective amount of nanoscale iron aluminide and/or iron aluminum carbide particles in an alumina matrix for the removal of one or more gas constituents such as 1,3-butadiene in the mainstream smoke of a cigarette. Another embodiment provides a cigarette comprising tobacco cut filler, wherein the cut filler comprises iron aluminide and/or iron aluminum nanoscale carbide particles in an alumina matrix for the removal of one or more gas constituents such as 1,3-butadiene from the mainstream smoke of the cigarette. While direct placement of the nanoscale particles in the tobacco cut filler is preferred, the nanoscale particles may be placed in the cigarette filter, or incorporated in the cigarette paper. The nanoscale particles can also be placed both in the tobacco cut filler and in other locations.

The intermetallic nanoscale particles will preferably be distributed throughout the tobacco rod portion of a cigarette. By providing the particles throughout the tobacco rod, it is possible to reduce the amount of gas constituents such as 1,3-butadiene drawn through the cigarette. The intermetallic nanoscale particles may be provided along the length of a tobacco rod by distributing the particles on the leaf tobacco prior to cutting or incorporating them into the cut filler tobacco using any suitable method. The particles may be provided in the form of a powder or in the form of a dispersion. The intermetallic nanoscale particles in the form of a dry powder can be dusted on the cut filler tobacco. The particles may also be present in the form of a dispersion and sprayed on the cut filler tobacco. Alternatively, the tobacco may be coated with a dispersion containing the particles. For instance, the particles may be added to the cut filler tobacco supplied to the cigarette making machine or added to a tobacco column just prior to wrapping cigarette paper around the tobacco column.

By distributing the nanoscale particles in the components of a cigarette, the amount of gas constituents such as 1,3-butadiene in mainstream smoke can be reduced, thereby also reducing the amount of 1,3-butadiene reaching the smoker and/or given off in second-hand smoke.

By preparing nanoscale intermetallic particles in an alumina matrix the particles are easier to handle and easier to combine with tobacco cut filler than unsupported nanoscale particles. The alumina matrix can act as a separator, which inhibits agglomeration or sintering together of the nanoscale particles during combustion of the cut filler. Particle sintering may disadvantageously elongate the combustion zone during combustion of the tobacco cut filler, which can result in excess 1,3-butadiene production. Because the alumina matrix can minimize particle sintering it can minimize the loss of active surface area of the nanoscale intermetallic particles.

In general, nanoscale intermetallic particles and an alumina matrix can be synthesized in any suitable ratio to give a desired loading of intermetallic particles in the matrix. For example, nanoscale iron aluminide particles can be synthesized via the $LiAlH_4$ reduction of $FeCl_3$ in THF to produce from about 0.1 to 90 wt. % nanoscale iron aluminide particles in an alumina matrix, e.g., about 1 to 90 wt. %, about 5 to 80 wt. %, about 10 to 70 wt. %, about 20 to 60 wt. % or about 30 to 50 wt. % nanoscale particles of nanoscale iron aluminide particles and about 99 to 10 wt. %, about 95 to 20 wt. %, about 90 to 30 wt. %, about 80 to 40 wt. % or about 70 to 50 wt. % alumina matrix, respectively. The amount of alumina that forms during the synthesis of the nanoscale intermetallic particles can be decreased by decreasing the amount of oxygen, e.g., ethereal solvent, present during the mixing and heating steps.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 or 5,322,075.

The term "mainstream" smoke refers to the mixture of gases passing down the tobacco rod and issuing through the filter end, i.e. the amount of smoke issuing or drawn from the mouth end of a cigarette during smoking of the cigarette.

The amount of the intermetallic nanoscale particles can be selected such that the amount of selected gas constituents (such as 1,3-butadiene) in mainstream smoke is reduced during smoking of a cigarette. Preferably, the amount of the intermetallic nanoscale particles will be an effective amount, e.g., from about a few milligrams, for example, 5 mg/cigarette, to about 100 mg/cigarette or more, sufficient to reduce the amount of selected gas constituents (such as 1,3-butadiene) in the mainstream smoke by at least about 10%, preferably at least about 25%, more preferably at least about 50%.

In cigarette manufacture, the tobacco is normally employed in the form of cut filler, i.e. in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g. burn additives, combustion modifying agents, coloring agents, binders, etc.) known in the art.

Any suitable tobacco mixture may be used for the cut filler. Examples of suitable types of tobacco materials include flue-cured, Burley, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

A further embodiment provides a method of making a cigarette, comprising (i) adding iron aluminide and/or iron aluminum carbide nanoscale particles in an alumina matrix to a tobacco cut filler, cigarette paper and/or a cigarette filter; (ii) providing the cut filler to a cigarette making machine to form a tobacco column; (iii) placing a paper wrapper around the tobacco column to form a tobacco rod; and (iv) optionally attaching a cigarette filter to the tobacco rod.

Techniques for cigarette manufacture are known in the art. Any conventional or modified cigarette making technique may be used to incorporate the intermetallic nanoscale particles. The resulting cigarettes can be manufactured to any known specifications using standard or modified cigarette making techniques and equipment. Typically, the cut filler composition is optionally combined with other cigarette additives, and provided to a cigarette making machine to produce a tobacco rod, which is then wrapped in cigarette paper, and optionally tipped with filters.

Cigarettes may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is typically from about 15 mm to about 30 mm in circumference, and preferably around 25 mm. The tobacco packing density is typically between the range of about 100 mg/cm$^3$ to about 300 mg/cm$^3$, and preferably 150 mg/cm$^3$ to about 275 mg/cm$^3$.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A method of manufacturing intermetallic nanoscale particles comprising iron aluminum carbide, comprising the steps of: preparing a mixture comprising a solvent, an iron salt and LiAlH$_4$; and heating the mixture to form the intermetallic nanoscale particles.

2. The method of claim 1, wherein the solvent comprises toluene, 1,3,5-trimethyl benzene, diethyl ether, tetrahydrofuran or mixtures thereof.

3. The method of claim 1, wherein the iron salt comprises iron chloride.

4. The method of claim 3, wherein the mixture of iron chloride and LiAlH$_4$ is refluxed in a non-aqueous solvent in an inert atmosphere for a period of about 1 to 48 hours.

5. The method of claim 1, wherein the LiAlH$_4$ is added to the mixture to give an atomic ratio of Al:Fe of about 10 to 52%.

6. The method of claim 1, wherein the step of preparing the mixture is carried out in an inert or reducing atmosphere.

7. The method of claim 1, wherein the step of preparing the mixture is carried out at a temperature of from about 20° C. to 100° C.

8. The method of claim 1, further comprising filtering the mixture prior to the step of heating.

9. The method of claim 1, further comprising drying the mixture prior to the step of heating.

10. The method of claim 9, wherein the mixture is dried in vacuum or in an inert atmosphere at a temperature of from about 100° C. to 250° C.

11. The method of claim 1, wherein the step of heating the mixture is carried out in an inert and/or reducing atmosphere.

12. The method of claim 1, wherein the step of heating the mixture is carried out in an atmosphere comprising hydrogen and argon.

13. The method of claim 1, wherein the mixture is heated at a temperature of from about 400° C. to 1200° C.

14. The method of claim 1, wherein the mixture is heated at a heating rate of less than about 5° C./min and the intermetallic nanoscale particles further comprise iron aluminide.

15. The method of claim 14, wherein the intermetallic nanoscale particles comprise greater than about 50% by volume iron aluminide.

16. The method of claim 1, wherein the mixture is heated at a heating rate of greater than about 5° C./min.

17. The method of claim 1 wherein the intermetallic nanoscale particles comprise iron aluminide particles having an average particle size of from about 2 to 10 nm.

18. The method of claim 1, wherein the intermetallic nanoscale particles comprise crystalline particles.

19. The method of claim 1, wherein the intermetallic nanoscale particles comprise magnetic particles.

20. The method of claim 1, wherein the nanoscale intermetallic particles have a B2 or DO3 ordered structure.

21. The method of claim 1, wherein the iron aluminum carbide nanoscale particles are formed in an alumina matrix.

22. A method of manufacturing intermetallic nanoscale particles comprising the steps of: preparing a mixture comprising a solvent, an iron salt and LiAlH$_4$; and heating the mixture to form the intermetallic nanoscale particles, wherein the mixture is heated at a heating rate of greater than about 5° C./min and wherein the intermetallic nanoscale particles comprise greater than about 50% by volume iron aluminum carbide.

23. A method of manufacturing intermetallic nanoscale particles comprising the steps of: preparing a mixture comprising a solvent, an iron salt and LiAlH$_4$; and heating the mixture to form the intermetallic nanoscale particles, wherein the intermetallic nanoscale particles comprise iron aluminum carbide particles having an average particle size of from about 30 to 100 nm.

24. A method of manufacturing intermetallic nanoscale particles comprising the steps of: preparing a mixture comprising a solvent, an iron salt and LiAlH$_4$; and heating the mixture to form the intermetallic nanoscale particles, wherein the intermetallic nanoscale particles consist essentially of Fe$_3$AlC$_{0.5}$.

25. A method of manufacturing intermetallic nanoscale particles comprising iron aluminum carbide, comprising the steps of: preparing a mixture of a solvent, iron chloride and LiAlH$_4$; and heating the mixture to form the intermetallic nanoscale particles.

26. A method of manufacturing intermetallic nanoscale particles comprising iron aluminide and iron aluminum carbide, comprising the steps of: preparing a mixture of a solvent, an iron salt and LiAlH$_4$, wherein the solvent is selected from the group consisting of toluene and 1,3,5 trimethyl benzene; and heating the mixture to form the intermetallic nanoscale particles, wherein the nanoscale particles comprise greater than about 50% by volume iron aluminide.

27. A method of manufacturing intermetallic nanoscale particles comprising the steps of: preparing a mixture of a solvent, an iron salt and LiAlH$_4$, wherein the solvent is selected from the group consisting of diethyl ether and tetrahydrofuran; and heating the mixture to form the intermetallic nanoscale particles, wherein the nanoscale particles comprise greater than about 50% by volume iron aluminum carbide.

28. A method of manufacturing intermetallic nanoscale particles comprising iron aluminide and iron aluminum carbide, comprising the steps of: preparing a mixture of a solvent, iron chloride and LiAlH$_4$; and heating the mixture to a temperature of from about 400° C. to 1200° C. at a heating rate of less than about 5° C./min. to form the intermetallic nanoscale particles, wherein the nanoscale particles comprise greater than about 50% by volume iron aluminide.

29. A method of manufacturing intermetallic nanoscale particles comprising the steps of: preparing a mixture of a solvent, iron chloride and LiAlH$_4$; and heating the mixture to a temperature of from about 400° C. to 1200° C. at a heating rate of greater than about 5° C./min. to form the intermetallic nanoscale particles, wherein the nanoscale particles comprise greater than about 50% by volume iron aluminum carbide.

* * * * *